United States Patent [19]
Gaskin et al.

[11] Patent Number: 5,988,954
[45] Date of Patent: Nov. 23, 1999

[54] VACUUM ATTACHMENT FOR POWER TOOL

[75] Inventors: Christopher S. Gaskin, Tacoma; Stuart E. Holm, Lakebay; Gary M. Moon, Auburn, all of Wash.

[73] Assignee: The Boeing Company, Seattle, Wash.

[21] Appl. No.: 09/229,233

[22] Filed: Jan. 12, 1999

[51] Int. Cl.⁶ .................................................. B23B 45/00
[52] U.S. Cl. ............................................. 408/67; 409/137
[58] Field of Search ............................. 409/137; 408/67, 408/14, 110, 112, 202, 241 S, 241 R

[56] References Cited

U.S. PATENT DOCUMENTS

| | | | |
|---|---|---|---|
| 1,927,871 | 9/1933 | Irwin et al. | 408/67 |
| 3,162,255 | 12/1964 | McCarty | 408/67 |
| 3,837,383 | 9/1974 | Ko | 408/67 |
| 4,372,401 | 2/1983 | Fischer . | |
| 5,033,917 | 7/1991 | McGlasson et al. . | |
| 5,034,041 | 7/1991 | Austin | 408/67 |
| 5,234,294 | 8/1993 | Hoppe et al. . | |
| 5,356,245 | 10/1994 | Hosoi et al. | 408/67 |
| 5,358,361 | 10/1994 | Jurski | 408/67 |
| 5,584,618 | 12/1996 | Blankenship et al. . | |
| 5,605,421 | 2/1997 | Hodgson | 408/67 |

*Primary Examiner*—Daniel W. Howell
*Attorney, Agent, or Firm*—Christensen O'Connor Johnson & Kindness PLLC

[57] ABSTRACT

A vacuum attachment device (10) contains a drill attachment portion (30) and a vacuum mounting portion (50). The drill attachment portion (30) is further composed of a longitudinally truncated cylinder section (32) and a lower funnel section (42). The cylinder section (32) has first and second snap-on arms (34) and (36) and a rear cylinder aperture (40). The lower funnel section (42) has a lower funnel connection aperture (44) which connects to the cylinder section (32) at the rear aperture (40). The vacuum mounting portion (50) contains a hose attachment section (52) and an upper funnel section (54). A vacuum mounting portion bonding surface (56) connects the vacuum mounting portion (50) to the drill attachment portion bonding surface (46) of the drill attachment portion (30).

35 Claims, 3 Drawing Sheets

VACUUM ATTACHMENT FOR POWER TOOL

FIELD OF THE INVENTION

The present invention relates to vacuum attachments for use on power tools, and more particularly to vacuum attachments for countersink cages that utilize snap-on mounting.

BACKGROUND OF THE INVENTION

The assembly of many different types of fiber panels, including graphite carbon fiber panels, throughout various production processes requires countersink drilling. Currently, undesirable graphite dust particles and chips are produced in an uncontrolled manner when countersink drilling is performed. This unchecked production of graphite dust particles and chips creates an unacceptable workplace environment. The afore-described concerns resulting from graphite fiber and fiberglass dust particles have made the utilization of vacuum attachment devices for countersink cages a standard protocol in countersink drilling. A countersink cage is a cylindrical-shaped guard that surrounds a countersink drill bit. The countersink cage is calibrated to set the depth to which the countersink drill is allowed to bore. Countersink cages are designed to allow chips, particles, and dust to be expelled during the drilling process. Vacuum attachment devices are mounted on countersink cages so as to catch the expelled chips and particles produced during the drilling process and route them to a vacuuming device. However, because of the added production time involved with mounting and unmounting current vacuum attachment devices to countersink cages, and readjusting countersink depth settings, many countersink drill users are tempted to abstain from using vacuum attachment devices, even though they desire the protection such devices provide. The disadvantages of current vacuum attachments force countersink drill users to choose between maintaining proper workplace environment standards, and sacrificing valuable production time.

Prior vacuum attachment devices have also failed due to a variety of additional factors, including cost, functionality, material strength, and material durability. One of the conceptual failures embodied in previous vacuum attachment devices was the requirement of disassembling countersink cages in order to properly mount the vacuum attachment devices. Mounting of these prior devices also resulted in the need to reset the countersink calibration depths. These steps are undesirable because they are time consuming, and because changes in countersink depth settings can produce defects, such as overly shallow or deep countersinking. Material bond strength failure and relative complexity of design are also additional factors that have led to the lack of full acceptance and implementation of previous vacuum attachment devices.

There is a continuing need in the art for a vacuum attachment device that can quickly and easily mount onto countersink cages without requiring countersink cage disassembly or countersink depth recalibration. Sufficient material strength, low cost of materials, and relative ease of manufacture are additional advantageous characteristics which are desired in a vacuum attachment device.

SUMMARY OF THE INVENTION

The present invention is directed towards a vacuum attachment device for connecting a vacuuming mechanism to a power tool, such as a countersink cage. The device contains a drill attachment portion that has a configuration and material composition that facilitates snapping the device onto and off of the power tool. The device also includes a vacuum mounting portion that is coupled to the drill attachment portion, and has a configuration and material composition that facilitates mounting a vacuum mechanism hose onto the vacuum attachment device.

In a preferred embodiment of the vacuum attachment device, the drill attachment portion is shaped approximately as a longitudinally truncated cylinder. The drill attachment portion snaps onto the power tool laterally. The vacuum mounting portion preferably expands to create an enhanced seal with the vacuum mechanism hose.

In another aspect of a preferred embodiment, vacuum attachment device is composed of a urethane composition. The device is of a dual durometer composition, with the drill attachment portion having a different hardness value than the vacuum mounting portion. Preferably, the drill attachment portion has a greater hardness value than the vacuum mounting portion. The drill attachment portion is preferably approximately between 70 A and 85 D on the elastomer hardness shore scale, more preferably approximately between 65 D and 80 D, and most preferably approximately 70 D. The vacuum mounting portion preferably is approximately between 40 A and 90 D on the elastomer hardness shore scale, more preferably approximately between 45 D and 60 D, and most preferably approximately 55 D.

In a preferred embodiment of the vacuum attachment device, the drill attachment portion is configured specifically to attach to countersink cages of various sizes. The vacuum mounting portion is also configured to attach to vacuum hoses of various sizes. In another preferred embodiment, the drill attachment portion and the vacuum mounting portion are formed as a single unit. In still another preferred embodiment, the drill attachment portion and the vacuum mounting portion are formed as separate pieces which are secured together.

The drill attachment portion of the present invention is configured to be laterally mountable onto the power tool. Although in one preferred embodiment vacuum attachment device, the drill attachment portion is configured and formed of a material of an appropriate hardness to "snap on" to the power tool, another preferred embodiment of the vacuum attachment device is configured simply to matably locate onto the outer circumference of a power tool. In this type of embodiment, a securement mechanism, such as a latching apparatus, is used to selectively affix the drill attachment portion of the attachment device to the power tool.

A vacuum attachment device constructed in accordance with the present invention utilizes lateral mounting and "snap on" methodology to achieve the beneficial efforts of dramatically reduced overall process time from countersinking (and other power tooling) operations. This is accomplished by allowing a user to snap on the vacuum attachment device without having to disassemble countersink cages and reset countersink depths. Further, the dual durometer construction of the vacuum attachment device allows the drill attachment portion to be of a material hardness suitable for "snap on" attachment, while the vacuum mounting portion is of a material hardness that enables attachment to a vacuum hose with enhanced sealability. The vacuum attachment device is low cost and easy to manufacture. Finally, since shortcomings with prior art attempts to resolve this problem have resulted in the lack of full implementation of prior vacuum devices, the present invention facilitates removal of undesirable graphite dust particles and chips, which are currently produced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
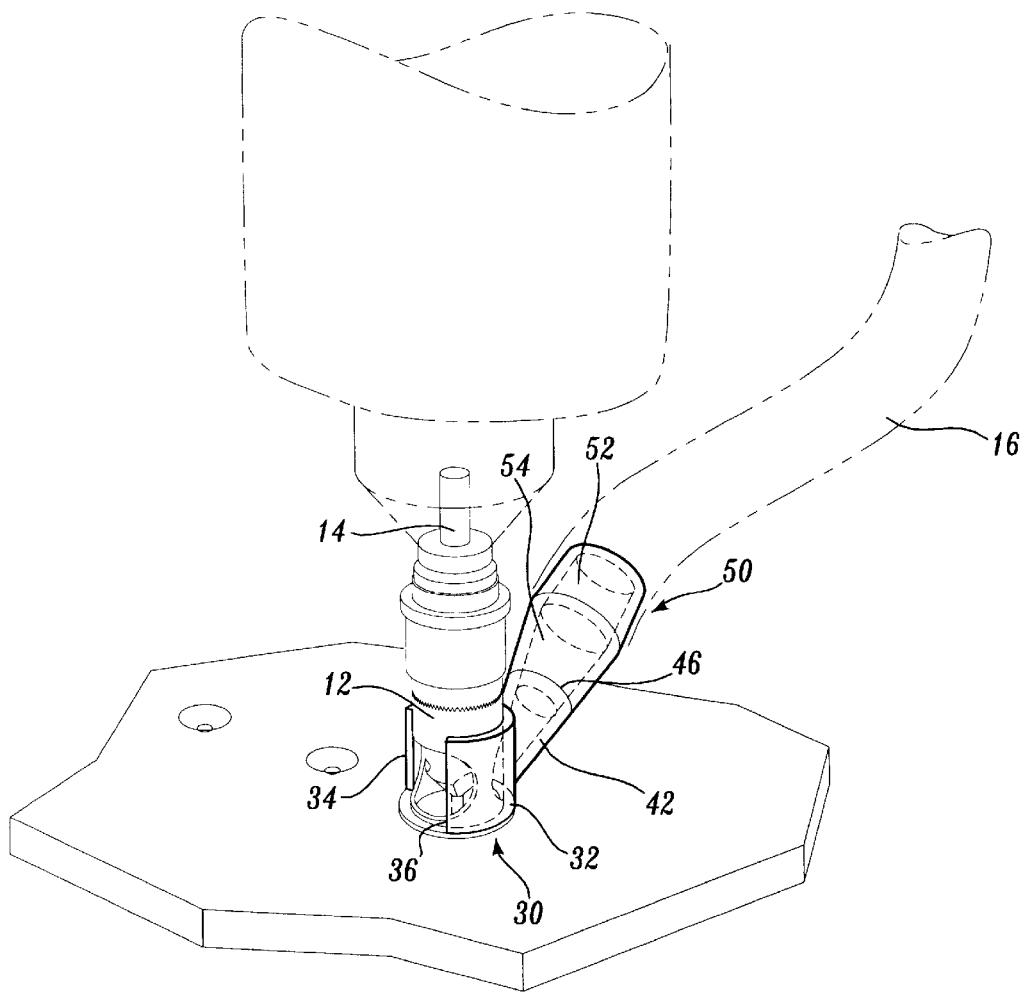
FIG. 1 illustrates a perspective view of the vacuum attachment device of the present invention with an attached vacuum hose, and mounted on a countersink cage with an attached drill, and an adjacent drilling surface.
Figure 2:
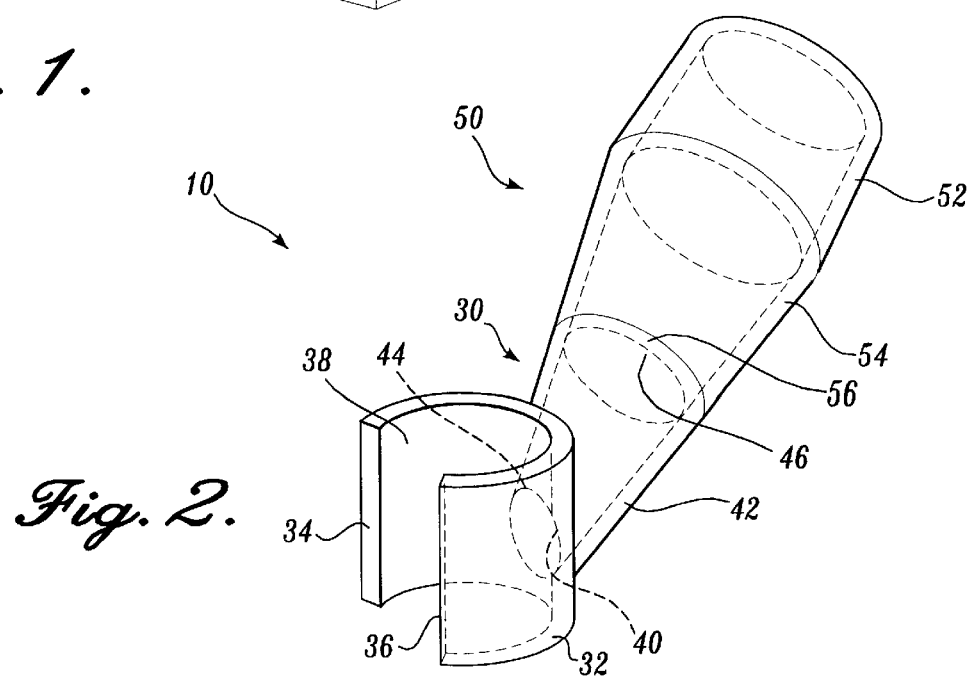
FIG. 2 illustrates a perspective view of the vacuum attachment device of FIG. 1, shown in isolation.

FIGS. 1 and 2 illustrate a preferred embodiment of a vacuum attachment device 10 constructed in accordance with the present invention shown mounted to a countersink cage 12 of a countersink drill 14, and secured to a vacuum hose 16. Briefly described, the vacuum attachment device 10 includes a drill attachment portion 30 and a vacuum mounting portion 50. The drill attachment portion 30 is further composed of a longitudinally truncated cylinder section 32 and a lower funnel section 42. The longitudinally truncated cylinder section 32 has first and second snap-on arms 34 and 36 and a rear cylinder aperture 40. The lower funnel section 42 has a lower funnel connection aperture 44 which connects to the longitudinally truncated cylinder section 32 at the rear cylinder aperture 40. The vacuum mounting portion 50 includes a hose attachment section 52 and an upper funnel section 54. A vacuum mounting portion bonding surface 56 connects the vacuum mounting portion 50 to the drill attachment portion bonding surface 46 of the drill attachment portion 30.

Figure 3:
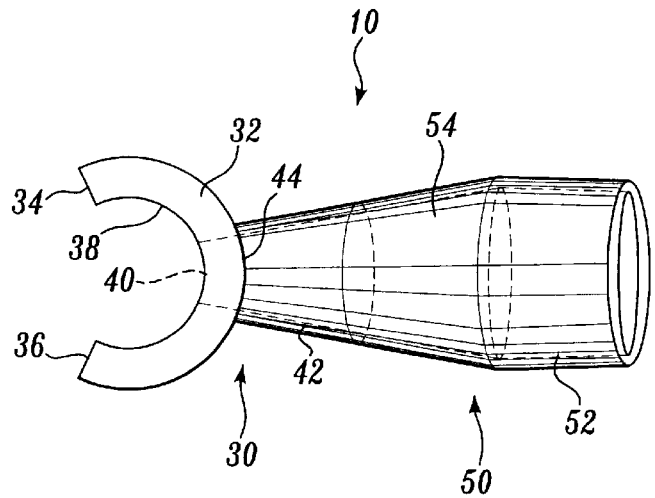
FIG. 3 illustrates a top view of the vacuum attachment device of FIG. 1.

Describing a preferred embodiment of the present invention in more detail, as shown in FIG. 2, the longitudinally truncated cylinder section 32 of the drill attachment portion 30 is approximately C-shaped (or mirror image C-shaped as shown in FIGS. 2 and 3) when viewed from above. The first and second snap-on arms 34 and 36 form the inwardly curving ends of the C-shape. As most clearly seen in FIG. 3, the C-shape of the longitudinally truncated cylinder section 32 represents approximately two-thirds of a circle in this particular preferred embodiment. Thus, the longitudinally truncated cylinder section 32 has an opening of approximately 120° in this preferred embodiment. As described in detail below, this is the opening by which the vacuum attachment device 10 laterally snap-mounts onto and off of a countersink cage 12. The size of this opening or longitudinally truncated region of the cylinder section 32 can vary substantially without departing from the scope of the present invention, based on several factors. These factors are selected so that snap-on arms 34 and 36 are flexible enough to snap onto and off of the countersink cage 12, yet the arms are resilient enough to retain connection with the countersink cage once mounted. One of these factors is the hardness of the material used to construct the drill attachment portion 30 of the vacuum attachment device 10. A vacuum attachment device 10 constructed of a harder material can snap mount onto and off of a countersink cage 12 with shorter arms 34 and 36, while a vacuum attachment device 10 constructed of a softer material requires longer arms 34 and 36 to properly and securely mount onto a countersink cage 12.

When a vacuum attachment device 10 is mounted onto a countersink cage 12, the first and second snap-on arms 34 and 36 snap mount over the substantially cylindrical outer surface of the countersink cage 12, such that the inner circumferential surface 38 of the cylinder section 32 correspondingly mates against the outer surface of the countersink cage 12. Centered between the first and second snap-on arms 34 and 36 is the rear cylinder aperture 40, which provides a vacuuming route from the inside of the countersink cage 12 into the lower funnel section 42. The lower funnel section 42 is frusticonical in shape and intersects the longitudinally truncated cylinder section 32 at an inverted angular orientation. In a preferred embodiment, the angle of intersection of the lower funnel section 42 is approximately 50–60 degrees from the longitudinal axis of the cylinder section 32. However, this angle can change substantially, throughout virtually any angle, without departing from the scope of the present invention. The lower funnel section 42 is hollow and transitions into the cylinder section 32 adjacent the lower funnel connection aperture 44. The upper end of the lower funnel section 42 forms a drill attachment portion bonding surface 46 which connects the drill attachment portion 30 to the vacuum mounting portion 50.

The vacuum mounting portion 50 has a hose attachment section 52 and an upper funnel section 54. The upper funnel section 54 is also frusticonical in shape, with the lower funnel section 42 being the frustum of the upper funnel section 54. Thus, the upper funnel section 54 and lower funnel section 42 can be characterized as separate regions of a single conical funnel. The upper funnel section 54 is also hollow, like its lower counterpart, and connects to the drill attachment portion bonding surface 46 of the lower funnel section 42 at a vacuum mounting portion bonding surface 56.

In a preferred embodiment of the present invention, the transition from the hose attachment section 52 to the upper funnel section 54 is the widest (or greatest circumferential) region of the vacuum mounting portion 50. The hose attachment section 52 is a hollow cylinder section that tapers slightly in diameter moving away from the upper funnel section 54. Thus, technically the hose attachment section 52 is also frusticonical, making the intersection of the hose attachment section 52 with the upper funnel section 54 the shared base of two oppositely-facing frusticones. The tapering of the hose attachment section 52 facilitates mounting a vacuum hose 16 onto the section 52. The vacuum hose 16 is simply slid onto the hose attachment section 52 of the vacuum mounting portion 50 until the hose 16 reaches a point where the diameter of the hose attachment section 52 prevents further mounting of the hose 16, thus forming a seal. The pressure produced by a vacuuming device to which the hose 16 is attached, enhances this seal. Preferably, the hardness of the material used to construct the vacuum mounting portion 50 is selected so that the hose attachment section 52 is flexible enough to expand slightly in response to the vacuuming pressure, thus producing a superior enhanced seal, yet the hose attachment section 52 is resilient enough to resume its original shape when the vacuum pressure is removed.

Figure 4:
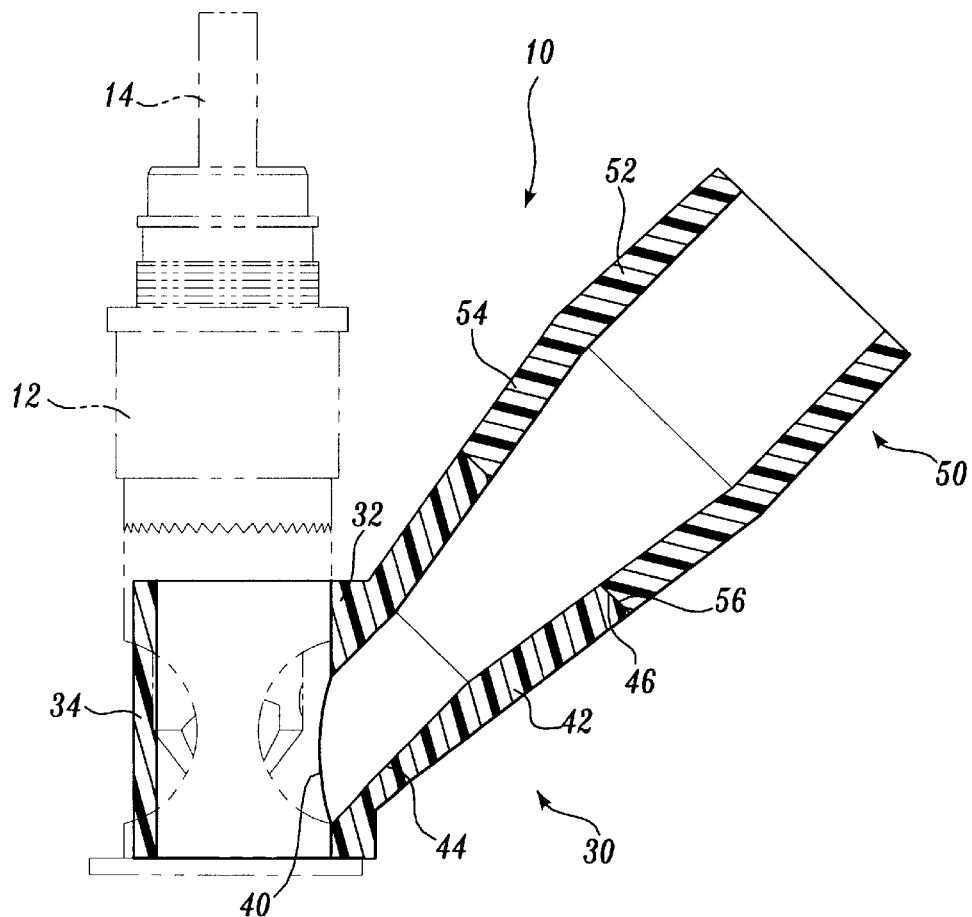
FIG. 4 illustrates a side cross-sectional view of the vacuum attachment device of FIG. 1, mounted on a countersink cage with an attached drill.

As best shown in FIG. 4, a preferred embodiment vacuum attachment device 10 is composed of two materials and has a dual durometer design. The drill attachment portion 30 is composed of a material A while the vacuum mounting portion 50 is composed of a material B. The drill attachment portion bonding surface 46 of the drill attachment portion 30 and the vacuum mounting portion bonding surface 56 of the vacuum mounting portion 50 are the intersecting surfaces between the material A and the material B. In a preferred embodiment of the present invention, the vacuum attachment device 10 is cavity-formed from two different durometers of urethane material, material A and material B. Materials A and B are selected such that the drill attachment portion 30, formed from material A, will bond to the vacuum mounting portion 50, formed from material B, as the vacuum attachment device 10 cures and forms an intermaterial bond of substantial strength.

Producing acceptable levels of material bond strength between material A and material B has proved at least in part to be manufacture-dependent. In one preferred embodiment of the present invention, materials A and B are made from two mixtures of a commercially available urethane resin and two different commercially available hardeners. In this particular embodiment, the drill attachment portion 30 which is constructed from material A is made from a combination of 50 parts by volume of IE70-D hardener produced by Innovative Polymers, Inc., of St. John, Mich., and 100 parts by volume of IE70-D resin. The vacuum mounting portion 50 composed of material B is made from a blend of 40 parts by volume of "Uralite" 3119 Part B hardener produced by H. B. Fuller Manufacturing of Chatsworth, Calif., and 100 parts by volume of H. B. Fuller Uralite 3125 Part A resin. Many other combinations and ratios of materials can be used without departing from the scope of the present invention, depending on the manufacturer from which the materials were procured. Not all manufacturers produce materials with the requisite qualities to support sufficient intermaterial bond strength. Further, many other types of materials besides urethane can be used to produce the vacuum attachment device 10 of the present invention, including but not limited to nylon, rubber, etc.

The vacuum attachment device 10 is then fabricated in a mold that is configured to allow the two urethane components, material A and material B, to meet at the transition bonding surfaces 46 and 56 of the drill attachment portion 30 and the vacuum mounting portion 50. During the curing process, the drill attachment portion 30 and the vacuum mounting portion 50 bond to one another. Thus, this preferred embodiment vacuum attachment device 10 is produced as a one-piece, two durometer vacuum attachment device.

In another embodiment of the present invention (not shown), the vacuum attachment device 10 could be formed as an attachable two-piece assembly with the drill attachment portion 30 and the vacuum mounting portion 50 formed as separate individual pieces. In this alternate preferred embodiment, the drill attachment portion 30 and the vacuum mounting portion 50 could then be attached by adhesively bonding them together, or otherwise secured to one another using any variety of coupling techniques known in the art. Further, in another alternate preferred two-piece embodiment of the present invention, the drill attachment portion and vacuum mounting portion could have their respective lower and upper funnel sections configured in a slightly modified design that would facilitate a sealing slip-fit or sleeve-type fit, where one portion of the funnel section would slide slightly over the other portion of the funnel section into a secured position.

The benefit of the above-described dual durometer preferred embodiment design of the vacuum attachment device 10 is derived from the fact that optimum hardness for the snap-on arms 34 and 36 of the drill attachment portion 30, is different from the optimum hardness of the hose attachment section 52 of the vacuum mounting portion 50. Preferably, the drill attachment portion 30 of the vacuum attachment device 10 is harder, i.e., has a larger hardness value on the elastomer hardness shore scale, than the vacuum mounting portion 50 of the vacuum attachment device 10. An acceptable hardness of the drill attachment portion 30, and specifically the snap-on arms 34 and 36, is necessary to obtain the "snap-on" effect. When in an acceptable hardness range, the snap-on arms 34 and 36 are sufficiently flexible to allow the vacuum attachment device 10 to be snapped on and off of a countersink cage 12 (or outer surface of another power tool) with ease, sufficiently resilient to maintain a hold on the countersink cage 12 after being snapped on, and return to their initial configuration state for reuse. If the snap-on arms are constructed of material with too large of a hardness value, the snap-on arms 34 and 36 either will not have the flexibility to snap over a countersink cage or will snap off when mounting is attempted. Conversely, if the snap-on arms are constructed of a material with too low of a hardness value, the snap-on arms 34 and 36 will slip on and off of a countersink cage too easily to sufficiently mount the vacuum attachment device 10.

It is also desirable to have the hardness level of the material which forms the vacuum mounting portion 50 within a certain hardness range to facilitate sliding the hose 16 onto the end of the hose attachment section 52. The preferable hardness level for the vacuum mounting portion 50 is typically (but not required to be) lower than that for the drill attachment portion 30, so that the hose attachment section 52 of the vacuum mounting portion 50 has enough residual flexibility, or "give" to expand slightly in response to the vacuuming pressure and produce an enhanced seal with a mounted vacuum hose 16. However, preferably the hardness level of the hose attachment section 52 also is such that the section 52 is resilient enough to resume its original shape when the vacuum pressure is removed. If the vacuum mounting portion 50 is constructed of a material with too high of a hardness level, the expanding ability of the hose attachment section 52 to seal with the vacuum hose 16, will be lost.

However, in another preferred embodiment of the present invention, the vacuuming mounting portion 50 is constructed of a material with a hardness value that does not facilitate the above described expanding ability but instead utilizes another hose securement mechanism (not shown), such as a screw tightening clamp, to firmly secure the hose 16 to the hose attachment section 52. In still another preferred embodiment of the present invention, the vacuuming mounting portion 50 of the device 10 is threaded so that a correspondingly threaded hose 16 can be "screwed" onto the device 10 and thereby secured. Finally, in yet another variation of the present invention, the vacuum mounting portion 50 is configured to receive and secure a vacuum hose 16 on the inside of the mounting portion 50.

The hardness of the drill attachment portion 30 of the vacuum attachment device is preferably approximately between 70 A and 85 D on the elastomer hardness shore scale. More preferably, the drill attachment portion is approximately between 65 D and 80 D on the elastomer hardness shore scale. Most preferably, the drill attachment portion has a value of approximately 70 D on the elastomer hardness shore scale. In contrast, the vacuum mounting portion 30 is preferably approximately between 40 A and 90 D on the elastomer hardness shore scale. More preferably, the vacuum mounting portion 50 is approximately between 45 D and 60 D on the elastomer hardness shore scale. Finally, the vacuum mounting portion 30 is most preferably approximately 55 D on the elastomer hardness shore scale. Brief analysis of the afore-described preferred ranges for the drill attachment 30 and the vacuum mounting portion 50 reveals that these preferred hardness ranges overlap. Thus, a preferred embodiment vacuum attachment device can be constructed in accordance with the present invention, which utilizes a single durometer and hence, single material design.

In a preferred embodiment of the present invention, the power tool, to which the drill attachment portion 30 of the device 10 is specifically configured to attach, is the countersink cage 12 of a countersink drill 14. In this preferred embodiment, the vacuum attachment device 10 is designed such that the drill attachment portion 30 is specifically configured to attach to a countersink cage 12, while the vacuum mounting portion 50 is configured to be compatible with vacuum hoses 16 of a size typically available in a countersink drilling workplace. Vacuum attachment devices 10 can be configured with drill attachment portions 30 and vacuum mounting portions 50 which are designed to be correspondingly matable with a wide variety of countersink cage sizes and vacuum hose sizes. Further, the drill attachment portion 30 can be designed to mount onto a variety of other types of power tools besides the countersink cages 12 of countersink drills 14, without departing from the scope of the present invention.

A vacuum attachment device 10 constructed in accordance with the present invention connects to a countersink cage 12 by mounting laterally onto the side of the cage. The arms 34 and 36 of the longitudinally truncated cylinder section 32, laterally attach to the countersink cage 12, thus dramatically shortening the overall process time involved with countersink drilling. Lateral mounting of the vacuum attachment device does not require disassembly of the countersink cages 12 and resetting of the countersink calibration depths, as did prior art vacuum attachment devices. These steps are time consuming and can result in miscalibration of the countersink cages.

Figure 5:
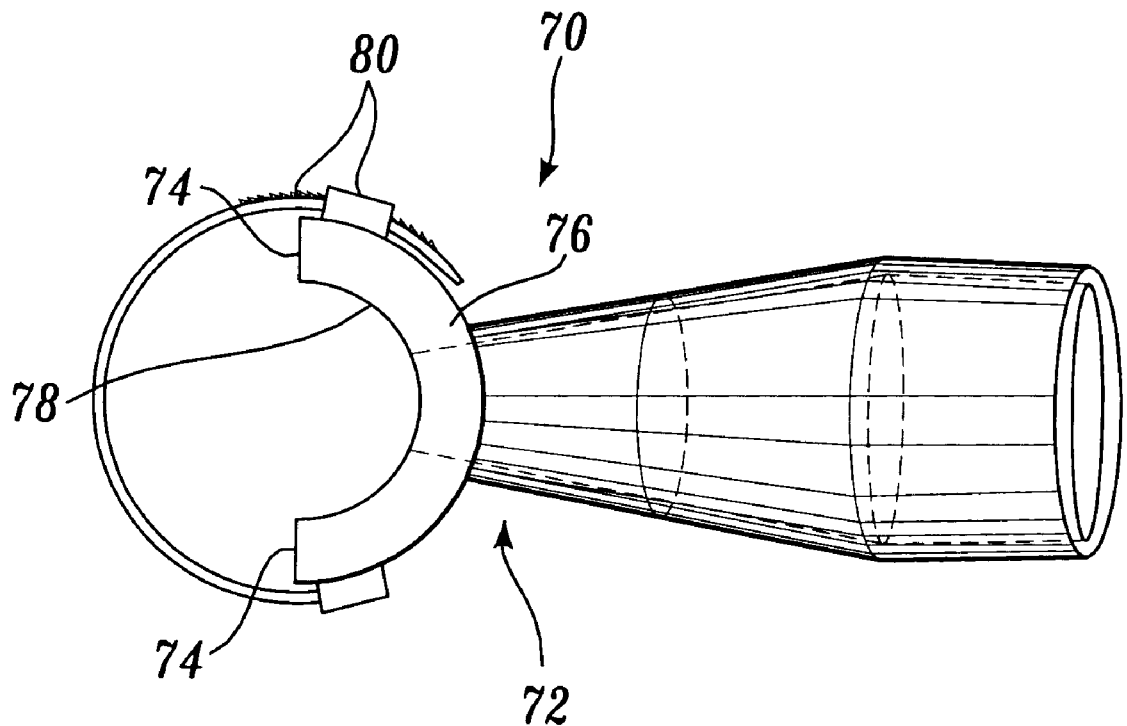
FIG. 5 illustrates a top view of another preferred embodiment vacuum attachment device of the present invention, which has shorter mounting arms and a securement mechanism.

Thus, as shown in FIG. 5, an alternate embodiment vacuum attachment device 70 employs a modified drill attachment portion 72 with truncated snap-on arms 74, which laterally mount or locate onto a countersink cage 12 (cage not shown in FIG. 5, but similar to that shown in the previous embodiments) without "snapping on". The modified longitudinally truncated cylinder section 76 still has an inner circumferential surface 78 that correspondingly mounts onto or is located against the outer surface of a countersink cage 12, but comprises a smaller portion of a circle when viewed from above. A longitudinally truncated cylinder section 76 forms only approximately a half of a circle. In this preferred embodiment, the mounting arms 74 do not snap on to the countersink cage 12, and thus, an additional securement mechanism 80 is necessary to mountably secure the alternate vacuum attachment device 70 onto a countersink cage 12. Any number of securement mechanisms 80 that are known and widely available in commerce could be used for this purpose, such as a buckle system, as is utilized on a shoe or ski boot. A securement mechanism 80 could also take the form of a clip system in which small protrusions (not shown) on the inner circumferential surface 38 or 78 of the cylinder section 32 or 76 would extend inward towards the cylindrical axis. These protrusions would then secure themselves in apertures of a countersink cage 12 when the device was mounted. These types of vacuum attachment devices 70 are useful in mounting the device on certain types of countersink cages or other power tools having outer surface configurations or protrusions onto which it is difficult to snap a vacuum attachment device 10, such as described above.

The vacuum attachment device 10 of the present invention is a low-cost apparatus compared to prior art vacuum attachment devices. The present invention is also simple to manufacture and has a low manufacturing production time. There is no welding, special chamfering, or finishing processes that need to be implemented in producing this urethane attachment. Additionally, the vacuum attachment device 10 could be manufactured from other materials having suitable properties and characteristics without departing from the scope of the present invention. Further, a single vacuum attachment device need not be relegated to a specific countersink cage, but can be carried around a manufacturing workplace from tool to tool due to its simple mountability and detachability.

The present invention has been described in relation to a preferred embodiment and several preferred alternate embodiments. One of ordinary skill in the art, after reading the foregoing specification, may be able to affect various other changes, alterations, and substitutions or equivalents thereof without departing from the concepts disclosed. It is therefore intended that the scope of the letters patent granted hereon be limited only by the definitions contained in the appended claims and equivalents thereof.

The embodiments of the invention in which an exclusive property or privilege is claimed are defined as follows:

1. A vacuum attachment device for connecting a vacuuming mechanism having a hose to a power tool, the device comprising:
   (a) a drill attachment portion having a configuration and material composition that facilitates snapping the device onto and off of a power tool; and
   (b) a vacuum mounting portion.

2. A vacuum attachment device of claim 1, wherein the vacuum mounting portion is coupled to the drill attachment portion, the vacuum mounting portion having a configuration and material composition that facilitates mounting the vacuum mechanism hose into the device.

3. A vacuum attachment device of claim 2, wherein the drill attachment portion is approximately shaped as a longitudinally truncated cylinder.

4. A vacuum attachment device of claim 2, wherein the drill attachment portion snaps on to a power tool laterally.

5. A vacuum attachment device of claim 2, wherein the vacuum mounting portion comprises a configuration and material composition that slightly expands to create an enhanced seal with the vacuum mechanism hose.

6. A vacuum attachment device of claim 2, wherein the device comprises of a urethane composition.

7. A vacuum attachment device of claim 2, wherein the device is of a dual durometer composition.

8. A vacuum attachment device of claim 2, wherein the drill attachment portion is of a greater hardness value than the vacuum mounting portion.

9. A vacuum attachment device of claim 2, wherein the drill attachment portion is approximately between 70 A and 85 D on the elastomer hardness shore scale.

10. A vacuum attachment device of claim 9, wherein the drill attachment portion is approximately between 65 D and 80 D on the elastomer hardness shore scale.

11. A vacuum attachment device of claim 10, wherein the drill attachment portion is approximately 70 D on the elastomer hardness shore scale.

12. A vacuum attachment device of claim 2, wherein the vacuum mounting portion is approximately between 40 A and 90 D on the elastomer hardness shore scale.

13. A vacuum attachment device of claim 12, wherein the vacuum mounting portion is approximately between 45 D and 60 D on the elastomer hardness shore scale.

14. A vacuum attachment device of claim 13, wherein the vacuum mounting portion is approximately 55 D on the elastomer hardness shore scale.

15. A vacuum attachment device of claim 2, wherein the drill attachment portion is configured to attach to countersink cages.

16. A vacuum attachment device of claim 2, wherein the drill attachment portion and the vacuum mounting portion are formed as a single unit.

17. A vacuum attachment device of claim 2, wherein the drill attachment portion and the vacuum mounting portion are formed as separate pieces and secured together.

18. A vacuum attachment device for connecting a vacuuming mechanism having a hose to a power tool having an outer surface, the device comprising:
   (a) a drill attachment portion configured to be laterally mountable onto a power tool;
   (b) a securement mechanism for selectively operatively associating the drill attachment portion to a power tool; and
   (c) a vacuum mounting portion coupled to the drill attachment portion, the vacuum mounting portion having a configuration and material composition that facilitates mounting the vacuum mechanism hose into the device.

19. A vacuum attachment device of claim 18, wherein the drill attachment portion is sized and shaped to mate with a portion of a power tool's outer surface.

20. A vacuum attachment device of claim 19, wherein the securement mechanism selectively affixes the drill attachment portion to a power tool.

21. A vacuum attachment device of claim 18, wherein the drill attachment portion snaps on to a power tool laterally.

22. A vacuum attachment device of claim 18, wherein the vacuum mounting portion is of a configuration and material composition that slightly expands to create an enhanced seal with the vacuum mechanism hose.

23. A vacuum attachment device of claim 18, wherein the device is composed of a urethane composition.

24. A vacuum attachment device of claim 18, wherein the device is composed of a dual durometer composition.

25. A vacuum attachment device of claim 18, wherein the drill attachment portion is of a greater hardness value than the vacuum mounting portion.

26. A vacuum attachment device of claim 18, wherein the drill attachment portion is approximately between 70 A and 85 D on the elastomer hardness shore scale.

27. A vacuum attachment device of claim 26, wherein the drill attachment portion is approximately between 65 D and 80 D on the elastomer hardness shore scale.

28. A vacuum attachment device of claim 27, wherein the drill attachment portion is approximately 70 D on the elastomer hardness shore scale.

29. A vacuum attachment device of claim 18, wherein the vacuum mounting portion is approximately between 40 A and 90 D on the elastomer hardness shore scale.

30. A vacuum attachment device of claim 29, wherein the vacuum mounting portion is approximately between 45 D and 60 D on the elastomer hardness shore scale.

31. A vacuum attachment device of claim 30, wherein the vacuum mounting portion is approximately 55 D on the elastomer hardness shore scale.

32. A vacuum attachment device of claim 18, wherein the drill attachment portion is configured to attach to countersink cages.

33. A vacuum attachment device of claim 18, wherein the drill attachment portion and the vacuum mounting portion are formed as a single unit.

34. A vacuum attachment device of claim 18, wherein the drill attachment portion and the vacuum mounting portion are formed as separate pieces and secured together.

35. A vacuum attachment device for connecting a vacuuming mechanism having a hose to a countersink cage, the device comprising:
   (a) a drill attachment portion configured to be laterally mountable onto a power tool;
   (b) a securement mechanism for selectively operatively associating the drill attachment portion to a power tool; and
   (c) a vacuum mounting portion attachable to the drill attachment portion, the vacuum mounting portion having a configuration and material composition that facilitates mounting the vacuum mechanism hose into the device.

* * * * *